United States Patent [19]
Walter

[11] 3,710,535
[45] Jan. 16, 1973

[54] APPARATUS AND METHOD FOR FORMING ARTICLE CARRIERS

[75] Inventor: Richard T. Walter, Norristown, Pa.

[73] Assignee: Container Corporation of America, Chicago, Ill.

[22] Filed: June 8, 1970

[21] Appl. No.: 44,336

[52] U.S. Cl. .................. 53/3, 53/29, 53/48, 53/183, 53/198 A
[51] Int. Cl. .................. B65b 13/04, B65b 17/04
[58] Field of Search............ 53/30, 84, 198, 48, 3, 29, 53/183

[56] References Cited

UNITED STATES PATENTS

| 3,611,656 | 10/1971 | Chidsey | 53/198 R X |
| 3,325,966 | 6/1967 | Bruce et al | 53/198 R |
| 3,589,091 | 6/1971 | Cloud | 53/184 X |

Primary Examiner—Theron E. Condon
Assistant Examiner—Eugene F. Desmond
Attorney—Carpenter, Ostis & Lindberg

[57] ABSTRACT

Method and apparatus for forming a carrier for an article group. The carrier is formed from webs extending around the individual articles of the group. Apparatus is provided for feeding a pair of inner webs between two rows of the group, and structure is provided for forming the webs so that each web half encircles the articles of each row. These webs are joined at the points of conjugacy of the articles. Apparatus is also provided for feeding a pair of webs along the outer sides of each row, and for joining such outer webs to the inner webs. Structure is provided for stretching the outer webs as they are adhered to the inner webs to rely on the memory characteristics of the thermoplastic resins forming the webs to insure that the article enclosing loops snugly fit the articles.

11 Claims, 9 Drawing Figures

3,710,535

APPARATUS AND METHOD FOR FORMING ARTICLE CARRIERS

BACKGROUND OF THE INVENTION

1. Field of the Invention

This invention relates to a method and apparatus for making an article carrier from web-like material. The resulting carrier consists of a plurality of conjugately arranged loops adapted to be fitted about a group of containers arranged in a predetermined relationship. The loops are formed in a unique method practiced in the apparatus disclosed herein.

This application is an improvement over the structure and method disclosed in Chidsey, Jr. application Ser. No. 31,520, filed Apr. 24, 1970, now U.S. Pat. No. 3,611,656, issued Oct. 12, 1971, for method and Apparatus for Forming Carriers for Container Groups.

2. The Prior Art

In the packaging of beverages, for example, those commonly known as six-packs, it has been the practice to form a carrier from a web of a resinous material having memory characteristics. The web is provided with apertures through which a container extends and is engaged. After the apertured web is placed over the container group, the resinous material of the web is shrunk about the individual containers, so that they are tightly secured by the web.

The following patents are illustrative of the prior art relating to carriers of the general type just discussed and formed in the manner recited.

| | |
|---|---|
| Poupitch | 2,874,835 |
| Poupitch | 2,997,169 |
| Fisher | 3,044,230 |
| Poupitch | 3,086,651 |
| Whyte | 3,232,422 |
| Cunningham | 3,268,070 |
| Wanderer | 3,269,530 |
| Beart | 3,307,321 |

In the formation of carriers as disclosed in the above patents, a moving web must be punched to provide the container receiving apertures, resulting in an inordinate amount of waste material.

Other forms of carriers made from resinous materials are shown in the following patents:

| | |
|---|---|
| Whiteford | 3,224,576 |
| Stern, et al. | 3,250,564 |
| Wanderer | 3,269,530 |

Structures of the kind disclosed in the just previously mentioned patents require the use of the complicated moulding equipment which cannot function in continuous uninterrupted cycles.

The following patents illustrate carriers formed from a flat sheet of resinous material having the property of being shrinkable about the containers. These carriers are formed with a minimum amount of loss in scrap material.

| | |
|---|---|
| Biesecker et al. | 2,994,426 |
| Curry et al. | 3,186,544 |
| Wozniak | 3,385,626 |

SUMMARY OF THE INVENTION

A carrier constructed according to the method and apparatus of present invention consist of conjugately arranged loops, each having an axial extent which is considerably greater than the thickness of the materials forming the loops. The tube-like elements are formed from a plurality of webs fed to moving container groups and adhered together between the containers of the group to provide a plurality of loops, each loop being adapted to hold tightly therein a container of the container group.

THE DRAWINGS

FIG. 1 is a plan view of apparatus for carrying out the method according to the present invention;

FIG. 2 to 6 inclusive are schematic plan views showing the steps employed in forming an article carrier in the apparatus seen in FIG. 1;

Figure 1:
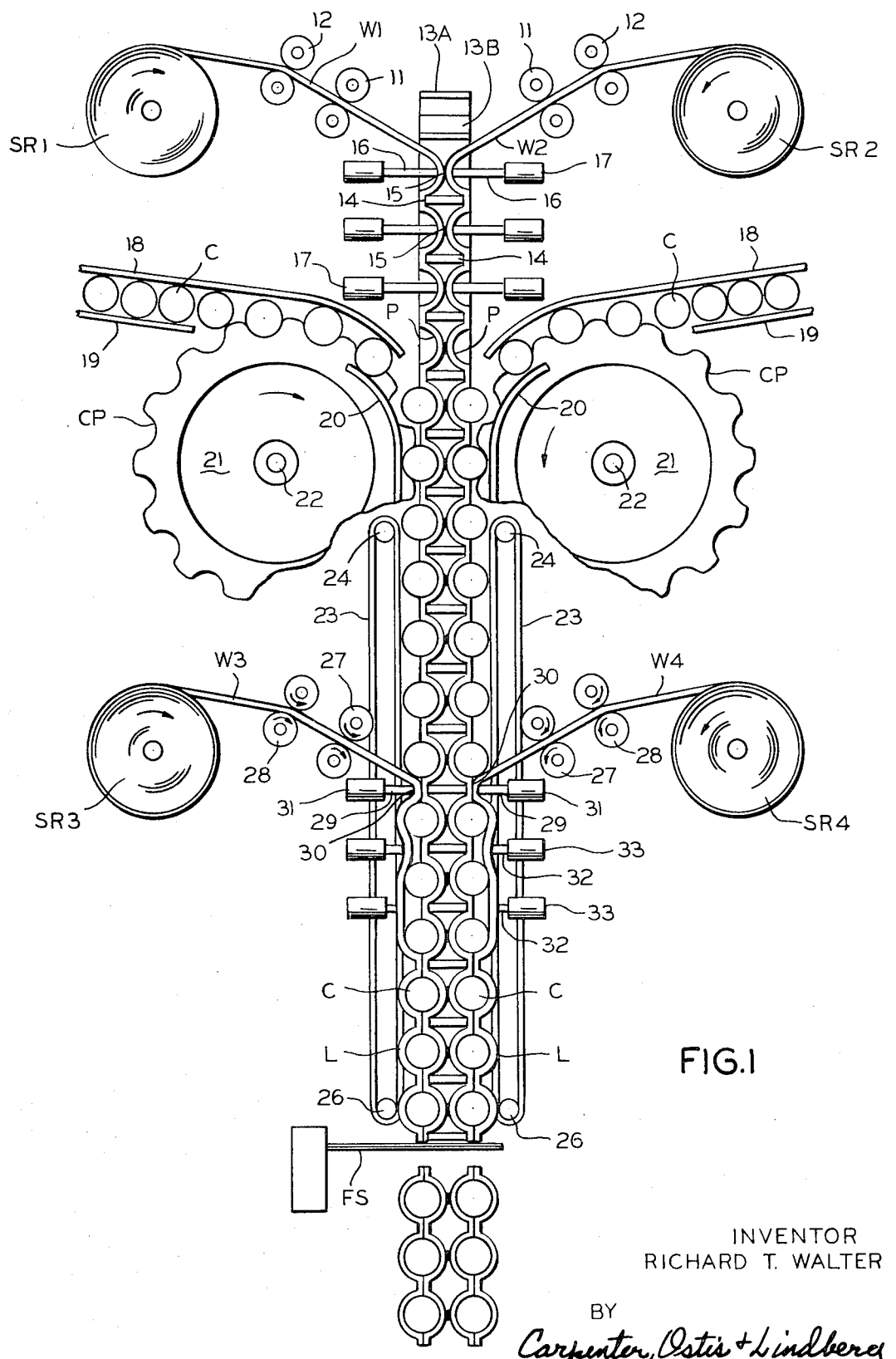
Figure 2:
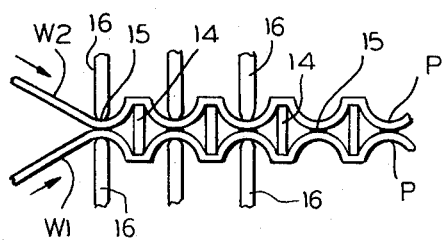
Figure 3:
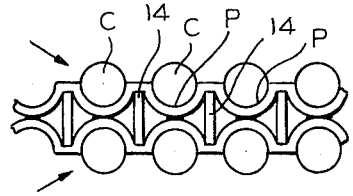

The improved apparatus and method according to the present invention is referred to generally by the reference numeral 10 and is adapted to form an article carrier 10A about an article or container group CG comprised of individual articles or containers C which may be of the type having upper and lower chimed ends CH.

Figure 6:
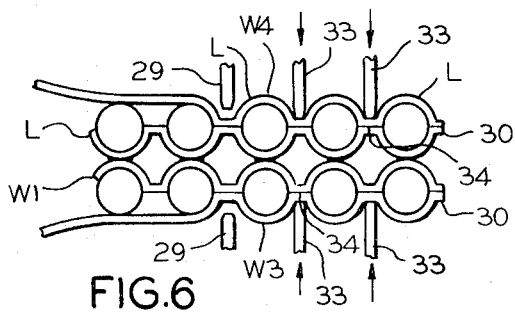
Figure 7:
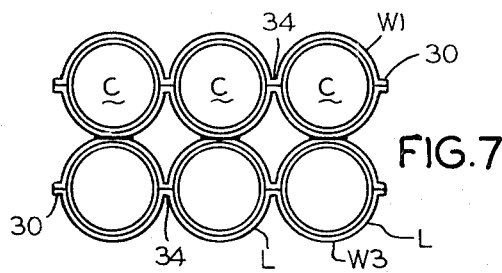
FIG. 7 is a plan view of a container group held within a carrier formed by the apparatus and method according to the present invention.
Figure 8:
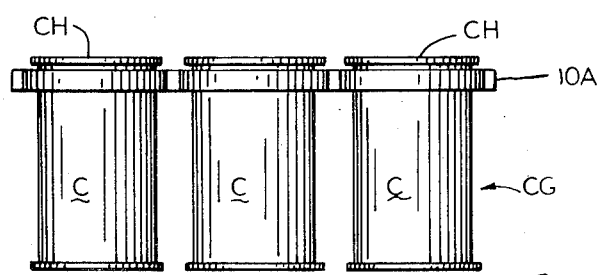
FIG. 8 is a side view thereof.

The structure for forming the carrier 10A about the container group CG seen in FIGS. 6 to 8 inclusive is seen in FIG. 1, and includes a pair of supply reels SR1 and SR2, these respectively supplying inner webs W1 and W2. The webs are preferably made of resinous material having memory characteristics for a purpose as will appear. In the several views seen the thickness of the webs is exaggerated to enable the invention to be described more readily. The webs W1 and W2 are preferably made of thermoplastic material and self adhere by the application of heat.

The two webs W1 and W2 may be adapted to be fed between paired spaced rollers 11 and 12, rollers 11 turning at a greater peripheral speed than rollers 12 so that the length of the webs therebetween is stretched a slight amount. The two webs W1 and W2 move in side-by-side relationship in timed relationship with a flight conveyor 13A having flights 14 thereon, these standing erect from the individual flight members 13B comprising conveyor 13. The webs W1 and W2 are spaced by the flights 14.

The two webs W1 and W2 are adhered together by means of heated welding members 16 movable to and fro laterally of the direction of the movement of the flight conveyor 13A by means of air cylinders 17. Structure, not shown, is provided for heating the members 16, and details of such structure are well known and need not be described in detail herein. Upon closing of the two laterally moving web members 16 with the webs W1 and W2 therebetween a weld 15 is made in webs W1 and W2 midway between a pair of upstanding flights 14.

It may be noted that the welding operation referred to takes place with such speed in the ordinary case that the welding members 16 and the actuating cylinders 17 do not need to move with the flight conveyor 13, and that the time of contact of the two webs W1 and W2 during such welding operation is such a short interval that a "flying" type of device may not be necessary. It may be noted also, that the welds 15 are made three at a time, and that the operation of the welding members 16 and cylinders 17 are timed according to the movement of conveyor 13A.

The two inner webs W1 and W2 are shown as extending in rather semi-circular fashion between adjacent flights 14. Actually, each web W1 and W2 is stretched a slight amount between adjacent flights 14 by reason of the operation of the welding members 16, 16.

The so-connected webs W1 and W2 thus have pockets P therein between the adjacent flights 14, and structure is provided for introducing a container C to each side-by-side pocket P. These are fed in a chute defined by side rails 18 and 19, and the containers C are properly spaced by star wheels 21 located one to each side of the flight conveyor 13A, and turning in timed relationship with the pockets P and flight conveyor 13A upon a shaft 22. Each of the star wheels 21 has container pockets CP therein, and in being guided to the pockets P formed in side-by-side webs W1 and W2, each individual container C moves additionally past a side rail member 20.

The containers C move with the flight conveyor 13A in side-by-side relationship with each container held in a pocket P formed in the inner webs W1 and W2, and the containers C are each constrained toward the pocket P by endless orbitally movable strands 23 trained at their upstream end around a sprocket 24 and at their downstream end around second sprocket 26. The strands shown herein are in the form of endless sprocket chains but they equally well may be endless belts trained between tail and head pulleys 24 and 26.

Downstream from the point where the containers C are moved to the individual pockets P, a pair of outer webs W3 and W4 are trained along side the outer faces of the articles C, and are joined respectively to the webs W1 and W2, as will now appear.

Each of the webs W3 and W4 is supplied from respective supply reel SR3 and SR4, and the webs W3 and W4 are additionally moved between spaced paired rollers 27 and 28 which stretch the webs W3 and W4 slightly, if desired, in the same fashion as the webs W1 and W2.

Structure is provided for adhering the webs W3 and W4 to the respective webs W1 and W2 in such a fashion that webs W3 and W4 are stretched to insure that they form loops L about the container bodies C. By reason of the memory characteristics of the resinous material forming the webs the loops L are firmly and snugly engaged about each container body C.

Figure 4:
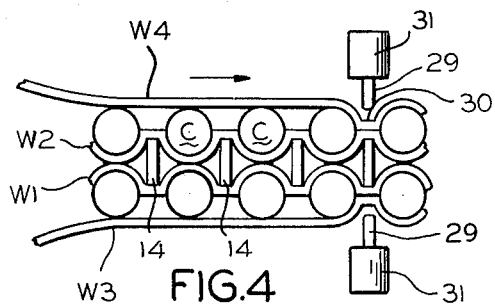
Figure 5:
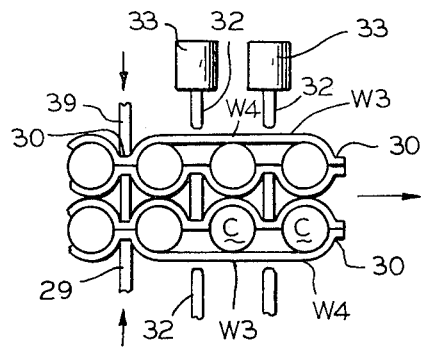

To this end welding members 29 operated by cylinders 31 are arranged to weld outer webs W3 and W4 to inner webs W1 and W2 at weldments 30. In so doing the webs W3 and W4 extend along the outer faces of the outer row of containers C as seen more clearly in FIGS. 4 and 5. Intermediate welding members 32 operated by cylinders 33 move against outer webs W3 and W4 to form weldments 34 with inner webs W1 and W2.

It will be seen that the outer webs W3 and W4 thereby tightly encircle each container C.

As with the heater members 16 and the actuating cylinders 17 providing for adherence of webs W1 and W3, welding members 29 and 32 actuating cylinders 31 and 33 may be mounted in such a fashion as to perform the sealing function in a "flying" manner. Unless the container body C moves at a very great speed a "flying" arrangement such is not necessary, so long as a good seal is made between the moving webs.

Figure 9:
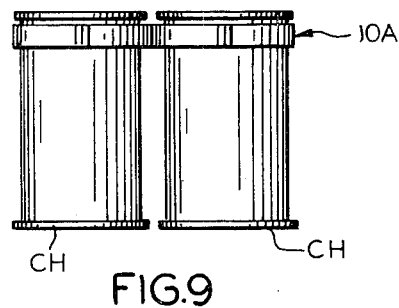
FIG. 9 is an end view thereof.

At the completion of the placement of the loops L about the container bodies C, a container group CG is separated from the moving line of containers by a flying shear FS operated by a shear mechanism FSM. The resultant group then appears as seen in FIGS. 7 to 9.

I claim:

1. In apparatus for forming article carriers having:
   a. means for feeding a pair of inner webs in side-by-side relationship;
   b. means for adhering the same together at longitudinally spaced points therealong;
   c. means for spacing the webs laterally so as to define an article receiving pocket between each point of adherence of said webs;
   d. means for delivering an article to each of said pockets so that said articles move in side-by-side rows;
   e. means for feeding a pair of outer webs along the outer sides of said articles;
   f. means for forming said last named webs about said articles and for adhering the same to corresponding inner webs to define an article encircling loops which are connected together;
   g. the improvement in said last named means wherein said last named means is:
      i. first operable to successively adhere said outer webs to said inner webs at points marking the beginning and end of a group of articles to be retained between all of the aforesaid webs;
      ii. said outer webs extending along the outer sides of said group between the beginning and the end of said group;
      iii. subsequently operable to engage the outer webs between articles of said group intermediate said beginning and end points to stretch said outer webs prior to adhering same to said inner webs.

2. Apparatus according to claim 1 wherein said inner webs spacing means includes an endless conveyor having web engaging flights extending therefrom.

3. Apparatus according to claim 1 wherein said means for forming said outer webs about said articles includes means movable against said inner web spacing means with one of said inner and outer webs engaged therebetween.

4. Apparatus according to claim 1 wherein said webs are formed from resinous materials having memory characteristics and wherein the means for feeding said inner webs includes means for stretching said webs whereby the memory characteristics of said resinous material causes said webs to engage said articles snugly.

5. Apparatus according to claim 4 wherein the means for forming the outer webs around said articles stretches said outer webs whereby the memory characteristics of said resinous materials causes said outer webs to engage said articles snugly.

6. The invention according to claim 1 where means are provided for severing said article carrier at regular intervals to provide discrete article groups.

7. The invention according to claim 1 wherein said webs are formed of thermoplastic materials and wherein the adhering means are adapted to heat said webs for adhesion.

8. A method of forming article carriers which comprises the steps of:
   a. feeding a pair of inner webs in side-by-side relationship;
   b. adhering same together at longitudinally spaced points therealong;
   c. spacing the adhered webs laterally between the points of adherence thereof to define article receiving pockets in each web;
   d. delivering an article to the pockets of each web so that said articles move in side-by-side rows;
   e. feeding a pair of outer webs along the outer side of said articles;
   f. forming said outer webs about said articles and adhering the same to corresponding inner webs to define article encircling loops which are connected together;
   g. the improvements in said method comprising the steps of:
      i. adhering said outer webs to said inner webs at points marking the beginning and end of a group of articles to be retained between all of the aforesaid webs;
      ii. adhering said outer webs to said inner webs between articles of said group intermediate said beginning and end points for stretching said outer webs prior to adhering the same to said inner webs.

9. A method according to claim 8 which includes the step of stretching said webs to rely on the memory characteristics thereof to cause the article engaging loops to firmly engage said articles.

10. A method according to claim 8 which includes the step of severing said webs at intervals defining said articles as article groups.

11. A method according to claim 8 wherein said webs are formed from thermoplastic material and said webs are adhered by pressure and heat.

* * * * *